T. W. NICHOLS.
DISTRIBUTING AND CUT-OFF VALVE OF FLUID PRESSURE MOTORS.
APPLICATION FILED FEB. 16, 1916.

1,286,725.

Patented Dec. 3, 1918.
3 SHEETS—SHEET 1.

Inventor
Thomas Winter Nichols
by his Attorney

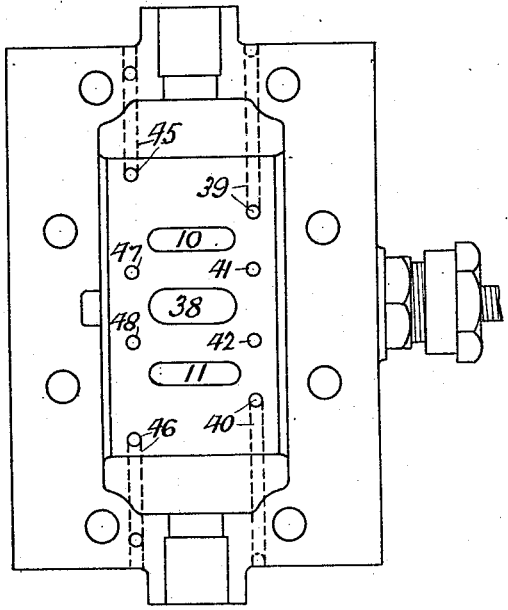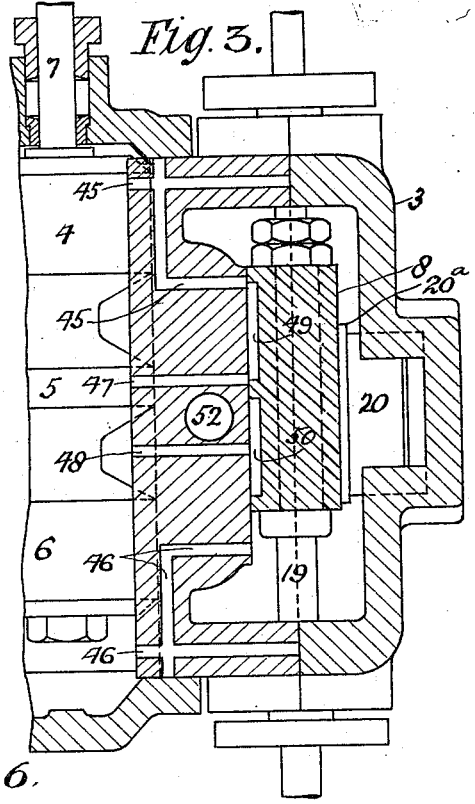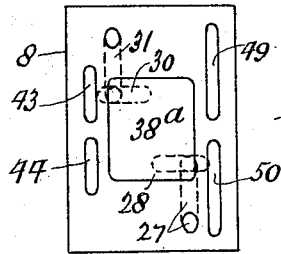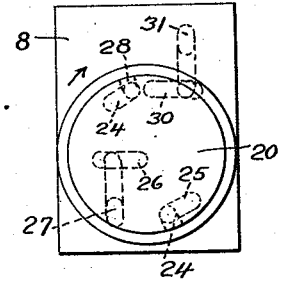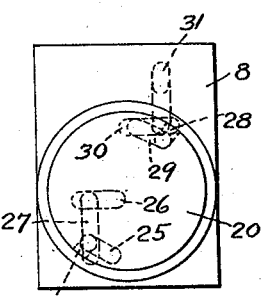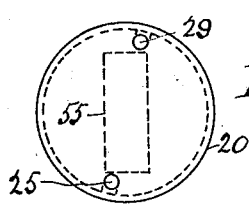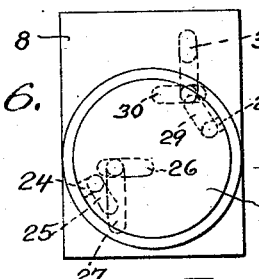

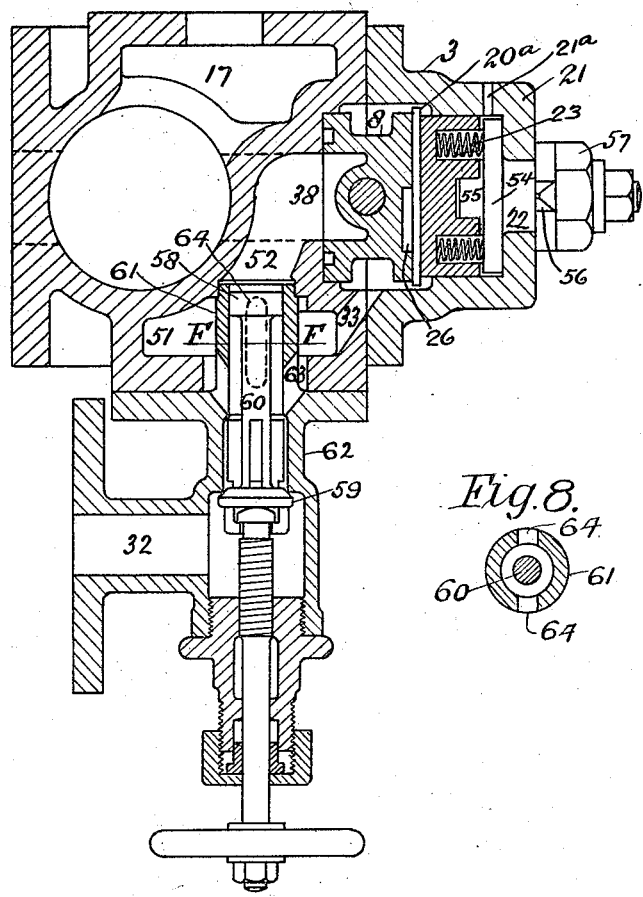

UNITED STATES PATENT OFFICE.

THOMAS WINTER NICHOLS, OF DURHAM, ENGLAND.

DISTRIBUTING AND CUT-OFF VALVE OF FLUID-PRESSURE MOTORS.

1,286,725. Specification of Letters Patent. Patented Dec. 3, 1918.

Application filed February 16, 1916. Serial No. 78,633.

*To all whom it may concern:*

Be it known that I, THOMAS WINTER NICHOLS, a subject of the King of England, residing at Gateshead, Durham, England, have invented certain new and useful Improvements in the Distributing and Cut-Off Valves of Fluid-Pressure Motors, of which the following is a specification.

This invention consists of improvements in or relating to the distributing and cut-off valves of fluid pressure motors of that type in which the movement of the distributing valve is controlled by the movement of the cut-off valve, said two valves being disposed in separate chambers divided by a ported partition.

The primary feature of the invention comprises a novel disposition of ports in the partition between the containing chambers of the distributing and cut-off valves, these ports being disposed in particular relation to the distributing valve and being controlled by the cut-off valve.

These ports comprise in combination main inlet ports, auxiliary ports, entering the distributing valve chamber at extreme opposite ends thereof for the purpose of admitting and exhausting the motive fluid which operates the distributing valve, other auxiliary ports also entering said chamber but at points more removed from its ends for the purpose of admitting and exhausting motive fluid adapted to maintain a constant fluid pressure on the distributing valve to insure steady and certain working thereof, together with further ports intermediate those mentioned and means for coupling the auxiliary and intermediate ports together in pairs whereby the former may serve alternately for inlet and exhaust of the motive fluid.

The invention further consists in a novel construction or arrangement of valve for regulating the supply of motive fluid to the cut-off valve and in a novel combination of said regulating valve with a stop-valve all as hereinafter fully described with reference to the accompanying drawings forming part of this specification and wherein:—

Figure 1:
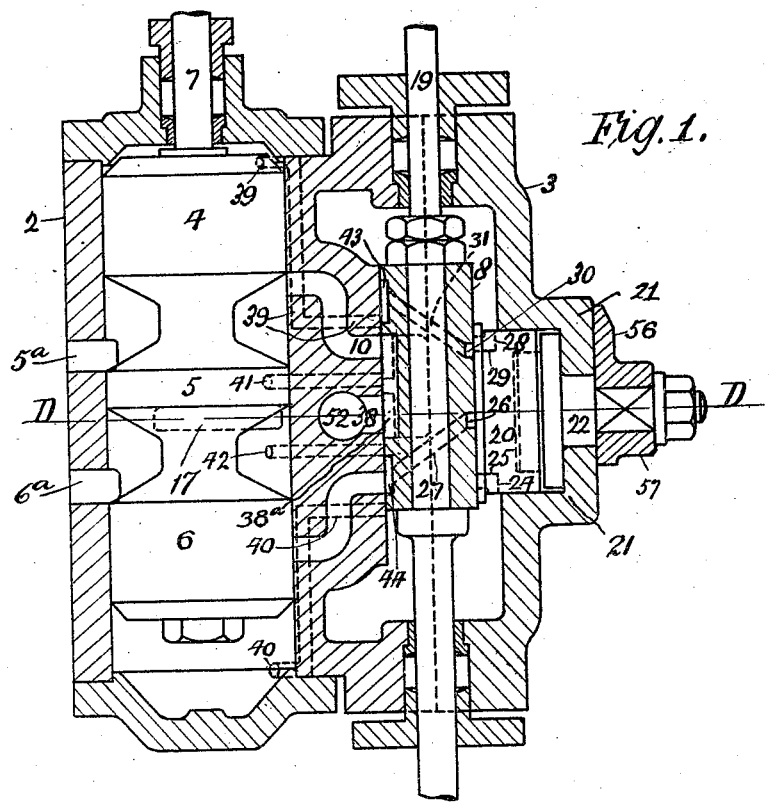
Figure 2:
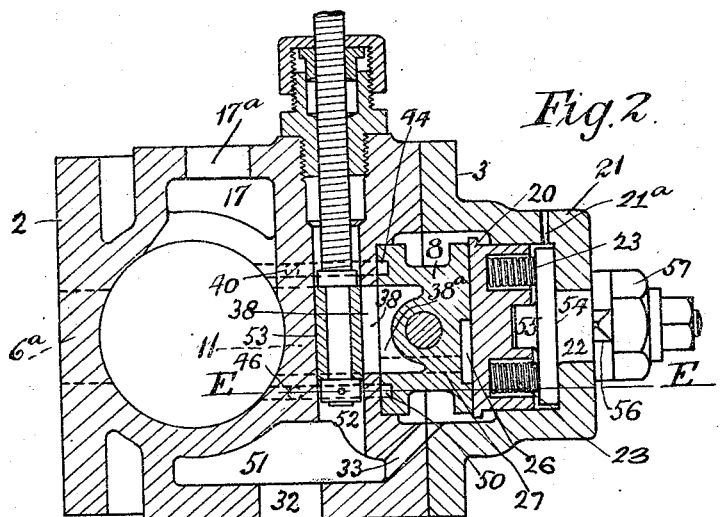

Figure 1 is a vertical section on the center line of the valve casings, Fig. 2 a horizontal section on the line D—D of Fig. 1, Fig. 3 a vertical section on the line E—E of Fig. 2. Fig. 4 is an elevation on the joint face and the valve face with the cut-off valve removed. Fig. 5 is an elevation of one face of the cut-off valve. Figs. 6, 6ª and 6ᵇ are elevations on the face of the relieving piston with the ports in different positions. Fig. 7 is a section corresponding to Fig. 2 showing a modification in which a regulating valve is combined with the stop valve and Fig. 8 is a section on the line F—F of Fig. 7.

In the embodiment illustrated in Figs. 1 to 6, 2 designates the distributing valve casing joined to the casing cover 3 of the cut-off valve 8 on the center line of the spindle 19 of said cut-off valve, and 4, 5 and 6 designate the rings of the distributing valve which is of the ordinary piston type and is provided with an actuating rod 7 provided with a handle to try the valve or determine its position. 5ª and 6ª designate the main through ports between the distributing valve casing and the pump or engine (not shown) to which the valve mechanism is applied. The cut-off valve 8 is of the D slide-valve type and a central port 38 in the partition face serves as the steam admission port, and steam ports 10 and 11 leading to the distributing-valve chamber are located on each side of said central port 38, a portway 38ª (Figs. 1 and 5) being provided in the under side of the valve 8 so that the movement of said valve 8 puts each steam port 10, 11 alternately in communication with the steam admission or central port 38. Near one side of the cut-off valve chamber two small ports 39 and 40 are provided in the valve face, one being in communication with the upper end of the distributing-valve chamber, and the other with the lower end of the same chamber. The position of these ports is such that the port 39 is uncovered and open to admit steam at the top of the distributing valve chamber for moving the valve downward therein when the cut-off valve 8 is at the bottom of its stroke, and the port 40 is uncovered to admit steam to force the distributing valve upward when the cut-off valve is at the top of its stroke. There are also two small intermediate ports 41 and 42 between the ports 39 and 40, preferably in line with them and drilled direct through into the distributing-valve chamber. The position of these latter ports is such that the lower one 42 of the pair is covered by the central ring 5 of the distributing valve when the latter is at the bottom of its stroke, and the upper one 41 is similarly covered when the valve is at the top of its stroke, the latter position being shown in Fig. 1. In the face of the cut-off valve a groove 43 is cut which provides communication between the two upper small ports 39 and 41 when the cut-off valve is at the top of its stroke, and another similar groove 44 provides communication between the two lower small ports 40 and 42 when the cut-off valve is at the bottom of its stroke. The ports 39 and 40 thus serve alternately for inlet and exhaust, the latter taking place to the atmosphere by means of the main exhaust port 17 having the outlet 17ª. Near the other side of the valve-chamber are also four small ports 45, 46, 47 and 48 in the partition face, the two central ports 47 and 48 being arranged exactly similar to the central ports 41 and 42, but the end or outer ports 45 and 46 open into the distributing-valve chamber at a certain distance from the ends of the chamber, so that they are covered by the end rings 4 and 6 of the distributing-valve when the latter is at the top and bottom of its stroke respectively, the former position being shown in Fig. 3. The object of these ports 45 and 46 is to admit additional steam to the ends of the distributing valve chamber to insure a constant pressure on the valve tending to keep same steady and certain in its action although there may be some leakage past the valve rings or pistons 4, 5 and 6 to the exhaust 17 due to wear of said rings. The upper one 45 of this pair of outer ports is so arranged that it remains uncovered and open to steam except when the cut-off valve is at the top of its stroke, and the lower one 46 is arranged to remain uncovered and open to steam except when the cut-off valve is at the bottom of its stroke. Grooves 49 and 50 are formed in the cut-off valve which provide communication between the two upper ports 45 and 47 and the two lower ports 46 and 48 respectively when the cut-off valve is at the top and bottom of its stroke, so that these ports also serve alternately for inlet and exhaust.

In order to insure also that the full steam pressure is always maintained in the cut-off valve chamber for admission to the portways 39 and 40 communicating with each end of the distributing-valve chamber, while the pressure in the steam cylinder may be varied, I provide a steam supply chamber 51 in communication with the main steam inlet 32 and having direct communication with the cut-off-valve chamber by means of a passage 33 and also with the steam admission port 38 to the D slide-valve 8 by a passage 52. In the latter passage or communication I provide a regulating valve 53 (shown as of the piston type) with means of adjustment from the outside so that the supply of steam to said steam admission port 38 can be regulated to suit the duty required in the steam cylinder.

The cut-off valve chamber is divided on the center line of the valve spindle 19, and the ports 39, 40, 41, 42, 45, 46, 47 and 48 are drilled at right angles to the valve face and to the cover of the cut-off valve chamber, or the end covers of the distributing valve chamber, no plugs being required for stopping the ends of the ports since any open holes are shut off by the covers, and the ports are thus easily examined and cleaned.

I also provide a cut-off control and pressure relief valve comprising a piston 20 working in a cylinder 21 formed in the cut-off valve chamber cover 3 and bearing on the outer face of the cut-off valve 8 to relieve the steam pressure existing in the cut-off valve chamber on said outer face of the valve, this being effected by providing the piston with a flange 20ª extended slightly beyond the edge of the piston against which flange only sufficient amount of fluid pressure bears to hold the piston 20 against said outer face of the valve while the back of said piston 20 and its containing cylinder 21 is always in communication with the atmosphere as through a narrow passage 21ª. Springs 23 are fitted in the piston to prevent the latter from being removed from the outer face of the valve when the mechanism is not in action. The piston is also capable of being rotated by a handle on its piston rod or spindle 22 in order to vary the ratio of expansion between the point of cut-off as set by the valve 8 and zero. For this purpose a hole 24 is drilled in the side of the piston 20 joining a slot 25 formed in the face of the piston and a suitable shaped groove 26 is cut in the back of the valve 8, a port 27 being formed through the valve from said groove to the face of the valve and communicating with the lower main steam port 11 after cut-off has taken place. Similar provision is made in the piston and valve for communicating with the upper main steam port 10, the parts being numbered 28, 29, 30 and 31 in the order mentioned above.

The slots 25 and 29 do not communicate with the grooves 26 and 30 when the fixed maximum cut-off as set by the cut-off valve with full expansion is required (see Fig. 6) but by rotating the piston 20, said slots 25 and 29 are placed more or less in communication with said grooves respectively and the required amount of steam is admitted through ports 27 and 31 to the main cylinder after cut-off has taken place by the valve 8 as shown in Figs. 6ª and 6ᵇ the former showing the mid-expansion and the latter the no expansion position of the piston 20. By these means the fixed cut-off of valve 8 can be reduced to zero or any intermediate extent.

The piston 20 is separate from the rod or spindle 22 which latter has a flange 54 provided with a rectangular boss 55 fitting into a socket in the back of the piston. A pointer 56 with a canted boss 57 is provided on a squared part of the spindle 22, so that the piston 20 may be adjusted to the desired cut-off.

In Figs. 7 and 8 a construction is shown in which a regulating-valve is arranged in combination with a stop-valve in such a manner that the latter valve is always open before any opening of the regulating-valve occurs. In this form the regulating-valve 58 is joined to the stop-valve 59 by a spindle 60 and a sleeve projection 61 is formed on the stop-valve casing 62 which fits into the passage 52. Ports 63 are provided through the sleeve 61 to admit steam to the supply chamber 51 when the stop valve is open and other ports 64 extend through said sleeve 61 controlled by the regulating-valve 58 for admitting steam from chamber 51 to the passage 52. It will be evident that the stop-valve 59 will be open to a certain extent before the ports 64 are uncovered by the regulating valve 58.

What I claim as my invention and desire to secure by Letters Patent of the United States is:—

1. In a fluid pressure motor, the combination with reciprocatory cut-off and distributing valves and a casing for said valves, of a partition dividing said casing into two chambers each of which receives one of the aforesaid valves, said partition having formed therethrough main inlet ports, auxiliary ports entering the distributing-valve chamber at the extreme opposite ends thereof and intermediate ports entering said chamber between said auxiliary ports, all said ports being so disposed in relation to the distributing-valve and being controlled by the cut-off valve, said cut-off valve having grooves in its face adapted to provide communication between said auxiliary ports and intermediate ports in pairs, that said auxiliary ports serve alternately for inlet and exhaust of the motive fluid to and from the distributing-valve chamber.

2. In a fluid pressure motor, the combination with reciprocatory cut-off and distributing valves and a casing for said valves, of a partition dividing said casing into two chambers each of which receives one of the aforesaid valves, said partition having formed therethrough main inlet ports, two pairs of auxiliary ports, one of each pair entering the distributing-valve chamber at extreme opposite ends thereof, and two pairs of intermediate ports entering said chamber between said auxiliary ports, all of said ports being so disposed in relation to the distributing-valve and being controlled by the cut-off valve, said cut-off valve having grooves adapted to afford communication between said auxiliary and intermediate ports in pairs, that certain of said auxiliary ports serve alternately for inlet and exhaust of the motive fluid to and from the distributing-valve chamber and others of said ports insure a constant pressure of motive fluid in said chamber to maintain steady action of the valve therein.

3. In a fluid pressure motor, the combination with reciprocatory cut-off and distributing valves and a casing for said valves, of a partition dividing said casing into two chambers each of which receives one of the aforesaid valves, said partition having formed therethrough main inlet ports, auxiliary ports entering the distributing-valve chamber at the extreme opposite ends thereof and intermediate ports entering said chamber between said auxiliary ports, all said ports being so disposed in relation to the distributing-valve and being controlled by the cut-off valve, said cut-off valve having grooves in its face adapted to provide communication between said auxiliary ports and intermediate ports in pairs, that said auxiliary ports serve alternately for inlet and exhaust of the motive fluid to and from the distributing-valve chamber, and pressure relief means in the cut-off valve chamber comprising a spring pressed piston acting on the exterior face of the valve.

4. In a fluid pressure motor the combination with reciprocatory cut-off and distributing valves and a casing for said valves, of a partition dividing said casing into two chambers, each of which receives one of the aforesaid valves, said partition having formed therethrough main inlet ports, auxiliary ports entering the distributing-valve chamber near opposite ends thereof and intermediate ports between said auxiliary ports, all said ports being so disposed in relation to the distributing-valve, and being controlled by the cut-off valve, said cut-off valve having grooves in its face adapted to provide communication between said auxiliary and intermediate ports in pairs, that a constant fluid pressure is maintained in the distributing-valve chamber to insure steady action of the valve therein and cut-off control means in the cut-off valve chamber comprising a rotatable piston bearing on the exterior of the valve and having ports adapted after cut-off has taken place to communicate through grooves and ports in the cut-off valve with the main inlet ports.

5. In a fluid pressure motor, the combination with reciprocatory cut-off and distributing valves and a casing for said valves, of a partition dividing said casing into two chambers each of which receives one of the aforesaid valves, said partition having formed therethrough main inlet ports, two pairs of auxiliary ports, one of each pair entering the distributing-valve chamber at extreme opposite ends thereof, and two pairs of intermediate ports entering said chamber between said auxiliary ports, all of said ports being so disposed in relation to the distributing-valve and being controlled by the cut-off valve, said cut-off valve having grooves adapted to afford communication between said auxiliary and intermediate ports in pairs, that certain of said auxiliary ports serve alternately for inlet and exhaust of the motive fluid to and from the distributing-valve chamber and others of said ports insure a constant pressure of motive fluid in said chamber to maintain steady action of the valve therein, and combined pressure relief and cut-off control means in the cut-off valve chamber acting on the exterior of the valve and comprising a rotatable spring pressed piston having ports adapted after cut-off has taken place to communicate through grooves and ports in the cut-off valve with the main inlet ports.

6. In a fluid pressure motor the combination with reciprocating cut-off and distributing valves and a casing for said valves, of a partition dividing said casing into two chambers in one of which is located the distributing valve and in the other of which is located the cut-off valve, said partition having throughgoing main inlet ports to the distributing valve chamber, and combined pressure relief and cut-off control means in the cut-off valve chamber acting on the rear face of the valve and comprising a rotatable spring pressed piston having ports adapted after cut-off has taken place to communicate through grooves and ports in the cut-off valve with the main inlet ports aforesaid.

7. In a fluid pressure motor the combination with reciprocating cut-off and distributing valves and a casing for said valves, of a partition dividing said casing into two chambers, in one of which is located the distributing-valve and in the other of which is located the cut-off valve, said partition having throughgoing ports to the distributing-valve chamber and a fluid supply port to the cut-off valve, a pressure fluid supply chamber in direct communication with the cut-off valve chamber and with said supply port to said cut-off valve, an adjustable regulating-valve in said fluid supply port to the cut-off valve and a stop-valve controlling the supply of fluid to said pressure fluid supply chamber acting in conjunction with said regulating-valve whereby the former valve is opened before opening of the latter valve can be effected.

8. In a fluid pressure motor the combination with a reciprocating grooved cut-off valve, a distributing-valve and a casing for said valves, of a partition dividing said casing into two chambers each of which receives one of the aforesaid valves, said partition having formed therethrough main inlet ports, auxiliary inlet and exhaust ports, and intermediate ports adapted by means of grooves in the cut-off valve to be coupled in pairs with said auxiliary ports, a fluid supply port to the cut-off valve, combined pressure relief and cut-off control means in the cut-off chamber acting on the rear face of the valve and adapted after cut-off has taken place to afford communication through the cut-off valve between the cut-off valve chamber and the main inlet ports, a pressure fluid supply chamber in direct communication with the cut-off valve chamber and an adjustable regulating valve in the aforesaid supply port to the cut-off valve.

In witness whereof I have signed this specification.

THOMAS WINTER NICHOLS.

Copies of this patent may be obtained for five cents each, by addressing the "Commissioner of Patents, Washington, D. C."